United States Patent [19]
Mizuta et al.

[11] Patent Number: 5,829,571
[45] Date of Patent: Nov. 3, 1998

[54] WORKPIECE POSITIONING APPARATUS

[75] Inventors: Akira Mizuta; Ryuichi Ommori, both of Kanagawa, Japan

[73] Assignee: Fuji Photo Film Co., Ltd, Japan

[21] Appl. No.: 732,700

[22] Filed: Oct. 18, 1996

[30] Foreign Application Priority Data

Oct. 20, 1995 [JP] Japan .................................. 7-273027
Aug. 30, 1996 [JP] Japan .................................. 8-230464

[51] Int. Cl.$^6$ ................................................ B65G 47/22
[52] U.S. Cl. ................ 198/345.1; 269/111; 269/254 CS; 414/749
[58] Field of Search .............................. 414/749, 16, 17, 414/18, 19, 14, 783; 198/345.1; 269/156, 111, 118, 254 CS

[56] References Cited

U.S. PATENT DOCUMENTS

4,619,448 10/1986 Leibinger et al. .................. 269/118 X

*Primary Examiner*—Donald W. Underwood
*Attorney, Agent, or Firm*—Brinks Hofer Gilson & Lione

[57] ABSTRACT

In a workpiece positioning apparatus for positioning a forwarding workpiece, the apparatus includes a forwarding device for forwarding a workpiece in a forwarding direction; a reference guide having a forwarding surface abutting against the workpiece in a first side of the workpiece with respect to the forwarding device; a workpiece press pressing the workpiece against the reference guide in a second side of the workpiece opposed to the reference guide and being movable in a direction away from the workpiece; a reference arm abutting against a first end of the workpiece with respect to the forwarding direction and being movable in a direction away from the workpiece; and a movable device abutting against a second end of the workpiece opposed to the first end in the forwarding direction for pressing the workpiece against the reference arm, and being movable in directions away from the workpiece. The apparatus can position workpieces of different product types without separate positioning tools.

18 Claims, 7 Drawing Sheets

WORKPIECE POSITIONING APPARATUS

BACKGROUND OF THE INVENTION

The present invention relates to a workpiece positioning apparatus that positions a workpiece on a forwarding surface.

In an automatic assembly line dedicated to produce one type of product in factories, automatic manufacturing apparatuses for various processes are coupled to each other by a forwarding device, so that a processed workpiece is transferred to a next process by such a forwarding device. In this case, the workpiece must be placed in position on the forwarding surface either at each automatic manufacturing apparatus or a workpiece pickup section.

Figure 8A:
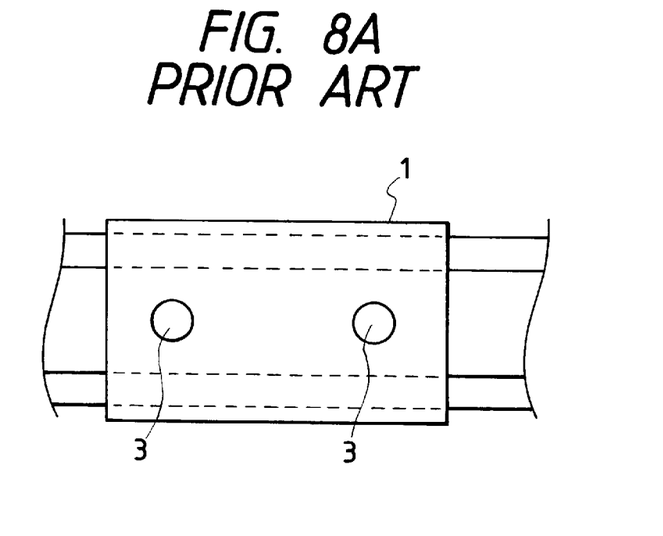
FIG. 8A is a plan view thereof and FIG. 8B is a side view thereof.
Figure 8B:
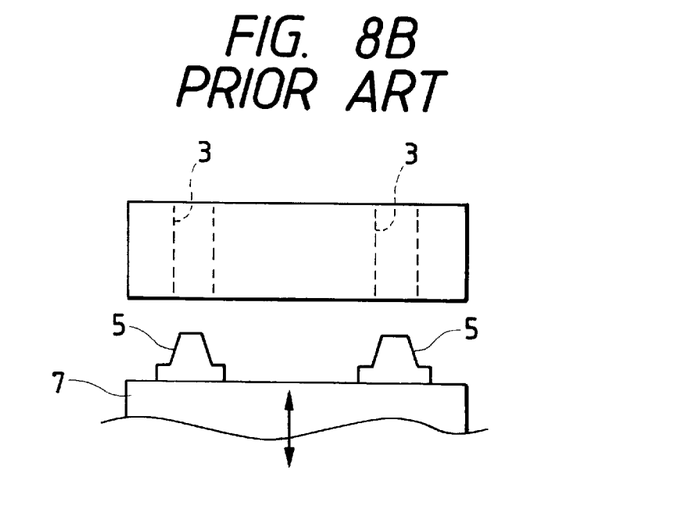
Figure 9:
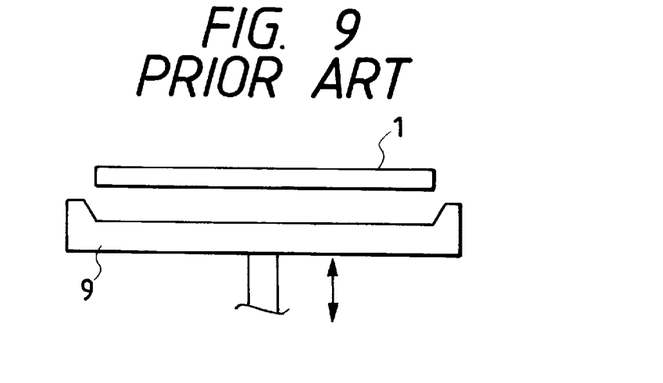
FIG. 9 is a diagram illustrative of a conventional positioning apparatus using a holding member.

Available for such automatic assembly lines are the following positioning apparatuses of this type. As shown in FIGS. 8A and 8B, one of the systems is such that positioning pins 5 that are designed to match holes 3 bored in a workpiece 1 are arranged on a positioning tool 7 and the positioning pins 5 are fitted into the corresponding holes 3 so that the workpiece 1 can be positioned. As shown in FIG. 9, another system is such that a holding member 9 fabricated so as to match the outside dimension of the workpiece 1 is abutted against the workpiece 1 so that the workpiece 1 can be positioned.

On the other hand, an automatic assembly line dedicated to produce different types of products generally supplies workpieces of different sizes and shapes on a lot basis.

In such a case, the positioning tools 7 and the holding members 9 corresponding to the respective product types are provided for the positioning apparatus of the aforementioned systems, so that it is required that these tools and the like be changed before the product type of a workpiece to be supplied is changed in order to place the workpiece of different product type in position.

However, if the positioning tools 7 and the holding members 9 are provided per product type, these tools and the like must be changed every time the product type of a workpiece to be supplied is changed. This system is not only cumbersome, but also time-consuming. As a result, the capacity utilization rate of the automatic assembly line drops and so does the productivity significantly. In addition, a great number of tools and the like must be arranged, which in turn entails cumbersome tool management. This has impaired production control efficiency. On the other hand, if tools are used interchangeably in order to reduce the number of tools, positioning errors may be increased, which might in turn cause defective positioning and hence has dropped the production efficiency.

SUMMARY OF THE INVENTION

The present invention has been made in view of the conventional circumstances. An object of the invention is to provide an inexpensive workpiece positioning apparatus that can position workpieces of different product types without using positioning tools and holding members, so that productivity can be improved.

To achieve the above object, the invention is applied to a workpiece positioning apparatus for positioning a forwarding workpiece, which includes: a forwarding device for forwarding a workpiece in a forwarding direction; a reference guide having a forwarding surface abutting against the workpiece in a first side of the workpiece with respect to the forwarding device; a workpiece press pressing the workpiece against the reference guide in a second side of the workpiece opposed to the reference guide and being movable in a direction away from the workpiece; a reference arm abutting against a first end of the workpiece with respect to the forwarding direction and being movable in a direction away from the workpiece; and a movable device abutting against a second end of the workpiece opposed to the first end in the forwarding direction for pressing the workpiece against the reference arm, and being movable in directions away from the workpiece.

When the workpiece has reached the set position on the forwarding surface by the forwarding device, the work presses are driven to press the workpiece onto the reference guide, so that the position of the workpiece in the directions orthogonal to the forwarding directions is regulated. Then, after the reference arm abuts against one end of the workpiece in the forwarding directions, the movable arm presses the workpiece onto the reference arm from the other end of the workpiece in the forwarding directions, so that the position of the workpiece in the forwarding directions is regulated. As a result, the workpiece can be positioned at the set position on the forwarding surface.

BRIEF DESCRIPTION OF THE DRAWINGS

FIGS. 3A and 3B are side views of the workpiece positioning apparatus of the invention as viewed along a line III—III of FIG. 1 from the downstream to the upstream side in a workpiece forwarding direction; specifically.

FIGS. 8A and 8B are diagrams illustrative of a conventional positioning apparatus using a positioning pin, in which

DETAILED DESCRIPTION OF THE PREFERRED EMBODIMENTS

Workpiece positioning apparatuses, which are preferred embodiments of the invention, will now be described in detail with reference to the drawings.

Figure 1:
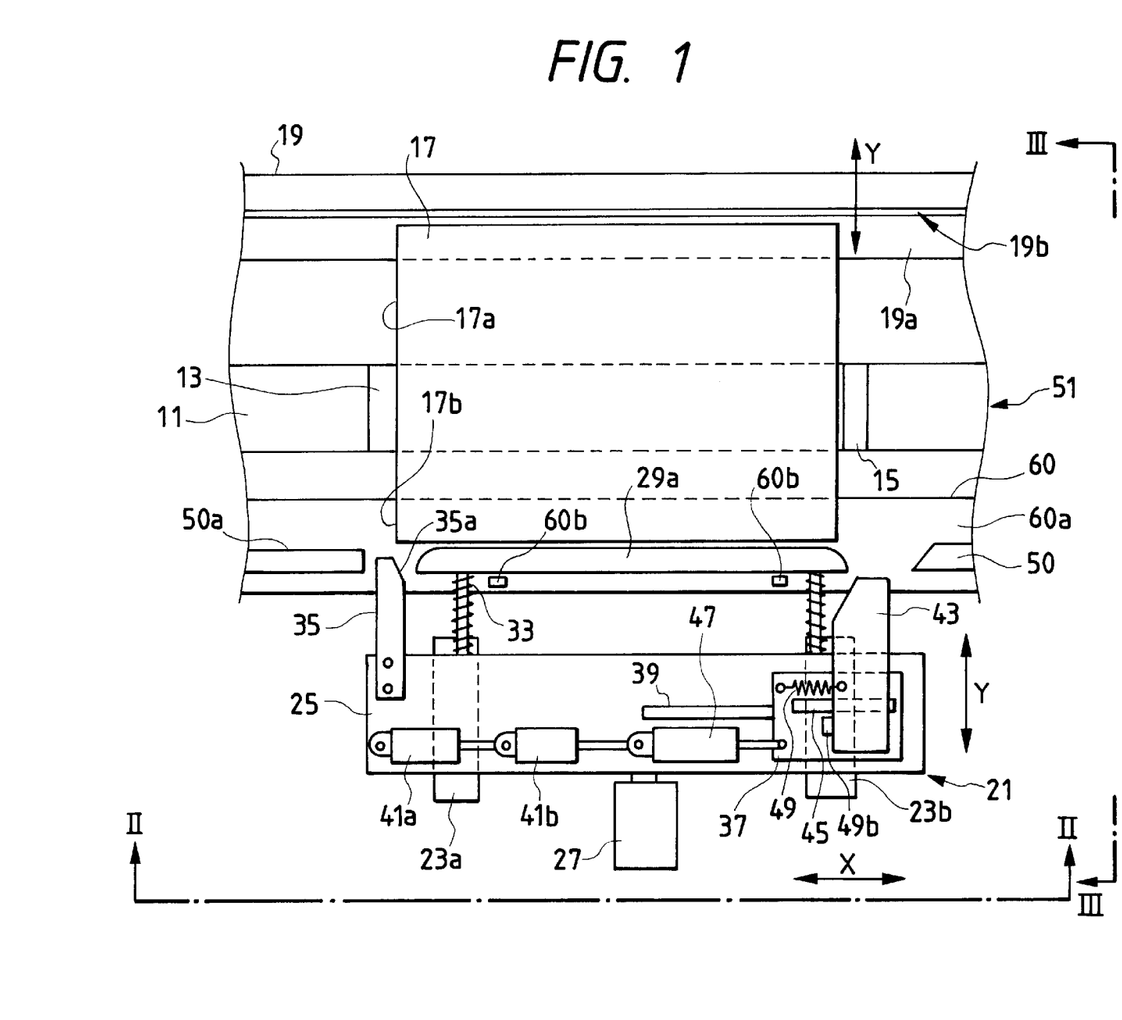
FIG. 1 is a plan view of a workpiece positioning apparatus of the present invention.

Forwarding claws 13, 15 are arranged on a forwarding device (belt conveyor) of an automatic assembly line. The distance between the forwarding claws 13, 15 is slightly larger than the total length of a workpiece 17 in a forwarding direction. Therefore, when the belt conveyor 11 moves in a forwarding direction, it is only the rear end 17a of the workpiece 17 (rear end as viewed in the forwarding direction) that abuts against the forwarding claw 13 (the condition shown in FIG. 1).

Further, the distance between the forwarding claws 13, 15 can be adjusted in accordance with the size of a workpiece by the method disclosed in U.S. patent application Sr. No. 08/496,784.

Figure 3A:
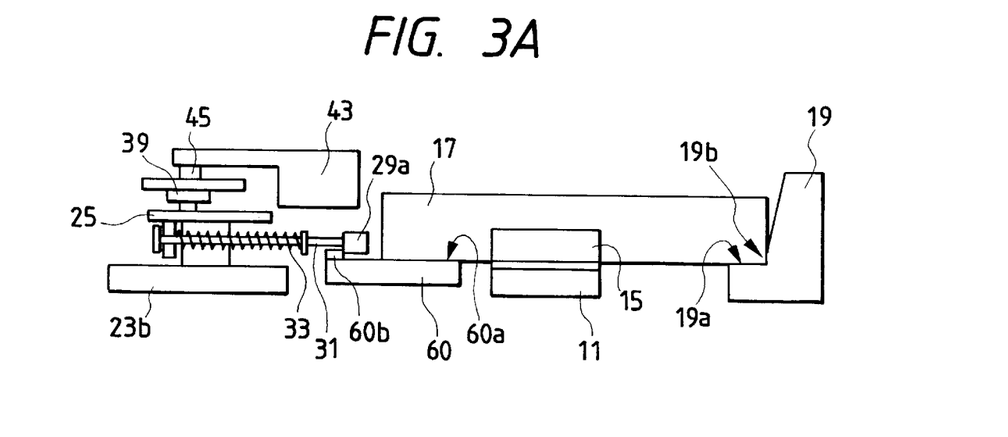
FIG. 3A shows a condition in which the workpiece positioning apparatus is not performing the operation of positioning a workpiece.
Figure 3B:
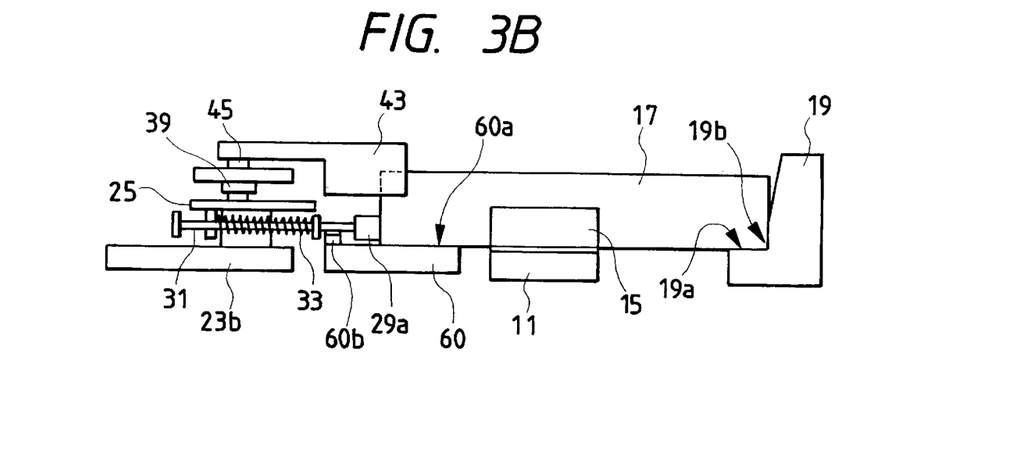
FIG. 3B shows a condition in which the workpiece positioning apparatus has positioned the workpiece.

As shown in FIGS. 3A and 3B, a reference guide 19 having an L-shaped cross section is arranged on one of the sides of a forwarding surface interposing a belt conveyor 11 therebetween, and a forwarding guide 60 is arranged on the other side. The reference guide 19 has an abutment surface 19a (forwarding surface) that abuts against the bottom surface of a workpiece 17, and a reference surface 19b that extends in parallel with the forwarding direction and crosses orthogonal to the forwarding surface. A moving device constructed of an air cylinder (not shown) or a ball-bearing leadscrew is arranged in the reference guide 19. The moving device allows the reference guide 19 to move to a desired position in directions parallel with the abutment surface 19a and orthogonal to the forwarding directions (the Y directions indicated by the arrows Y). A positioning unit 21 is arranged on the opposite side of the reference guide 19 while interposing the belt conveyor 11 therebetween. The positioning unit 21 moves in the directions orthogonal to the forwarding directions (the Y directions indicated by the arrows Y) with a base plate 25 mounted on slide rails 23a, 23b being driven by an air cylinder 27.

The base plate 25 has a workpiece press 29a projected on the belt conveyor 11 side. The workpiece press 29a is fixed so as to be slidable in the Y directions parallel with the forwarding surface and orthogonal to the forwarding directions of the workpiece 17. As shown in FIGS. 3A and 3B, springs 33 are arranged on sliding shafts 31 of the workpiece press 29a, respectively. The springs 33 urge the workpiece press 29a toward the reference guide 19. Therefore, when the base plate 25 is moved toward the belt conveyor 11 by the air cylinder 27, the workpiece press 29a abut against the workpiece 17. As the base plate 25 is further moved, the workpiece 17 is pressed toward the reference surface 19b by the springs 33.

It may be noted that the workpiece press 29a serves as a guide rail so that the workpiece 17 is guided in the forwarding direction when the base plate 25 is not moved toward the belt conveyor 11. Thus, stoppers 60b, which evacuate and stop the workpiece pressing surface of the workpiece press 29a up to such a position as to be coplanar with the guide surfaces of the guide rails 50a, 50b, is arranged on the forwarding guide 60.

Figure 2:
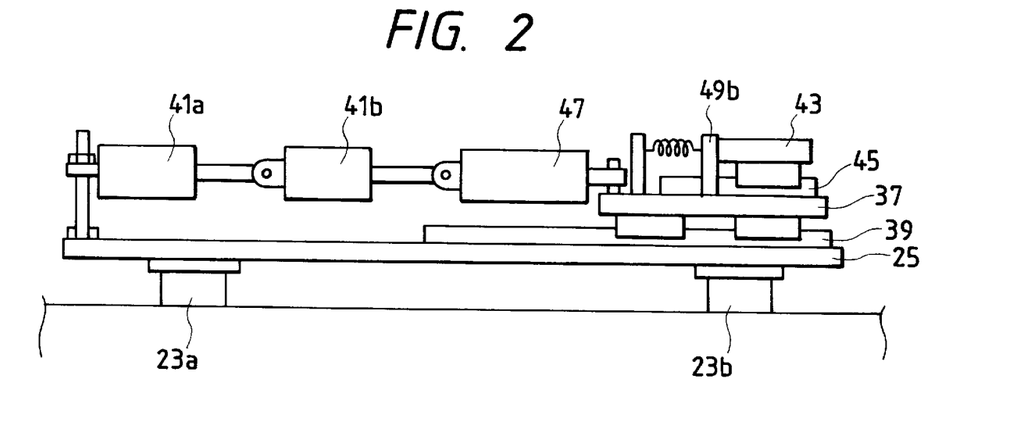
FIG. 2 is a view taken along a line II—II of FIG. 1 to show a positioning unit.

The reference arm 35 is arranged on one end of the base plate 25 in such a manner as to project toward the belt conveyor 11. The reference arm 35 has an inclined surface 35a that abuts against a corner 17b of the workpiece 17. A movable plate 37 is mounted on the other end of the base plate 25 through a slide rail 39 (see FIG. 2). The movable plate 37 is movable in the forwarding directions (the X directions indicated by the arrows X) along the slide rail 39 by three air cylinders 41a, 41b, 47.

A movable arm 43 is mounted on a movable plate 37 through a slide rail 45 (see FIG. 2) and is movable in the forwarding direction along the slide rail 45. One end of a positioning spring 49 is fixed to the movable arm 43, and the other end of the positioning spring 49 is fixed to a pillar erected on the movable plate 37. Therefore, when the drive shaft of either one of air cylinders 41a, 41b, 47 has been contracted, the movable arm 43 is moved in the reference arm 35 direction together with the movable plate 37. In addition, the movable arm 43 remains abutted against a stopper 49b while the present positioning apparatus is in stand-by position. It may be noted that reference numerals 50a and 50b denote the guide rails that are erected perpendicularly from an abutment surface 60a (forwarding surface) of the forwarding guide 60, the abutment surface 60a abutting against the bottom surface of the workpiece 17. These guide rails are provided to regulate the positions of workpieces that stay upstream and downstream of the positioning unit 21 at the time of forwarding the workpiece 17 by the forwarding claws 13, 15 of the belt conveyor 11. That is, the guide rails 50a, 50b regulate the positions of the workpieces so that the workpieces become parallel with the forwarding surface and orthogonal to the forwarding direction.

The distance between the workpiece press 29a and the abutment surface 19a against the workpiece 17 of the reference guide 19 at the time the workpiece positioning apparatus is not performing the workpiece positioning operation is set to a value slightly larger than a width of the workpiece 17, the width being parallel with the forwarding surface and orthogonal to the forwarding direction.

The size of the movable arm 43 in the forwarding direction is set to such a value that the workpiece 17 to be positioned by the positioning unit 21 will not come in contact with an adjacent workpiece. Further, if the height of the guide rail 50b from the forwarding surface is larger than that of the lowermost end portion of the movable arm 43 that is moving in the Y directions, then the size of the movable arm 43 is set to such a value as not to come in contact with the guide rail 50b as well. Still further, the length of the movable arm 43 in the directions orthogonal to the forwarding direction (Y directions) is set to such a value as not to come in contact with the forwarding claw 15 of the belt conveyor 11 when the movable arm 43 has positioned the workpiece 17 if the height of the forwarding claw 15 from the forwarding surface is larger than that of the lowermost end portion of the movable arm 43.

Figure 5:
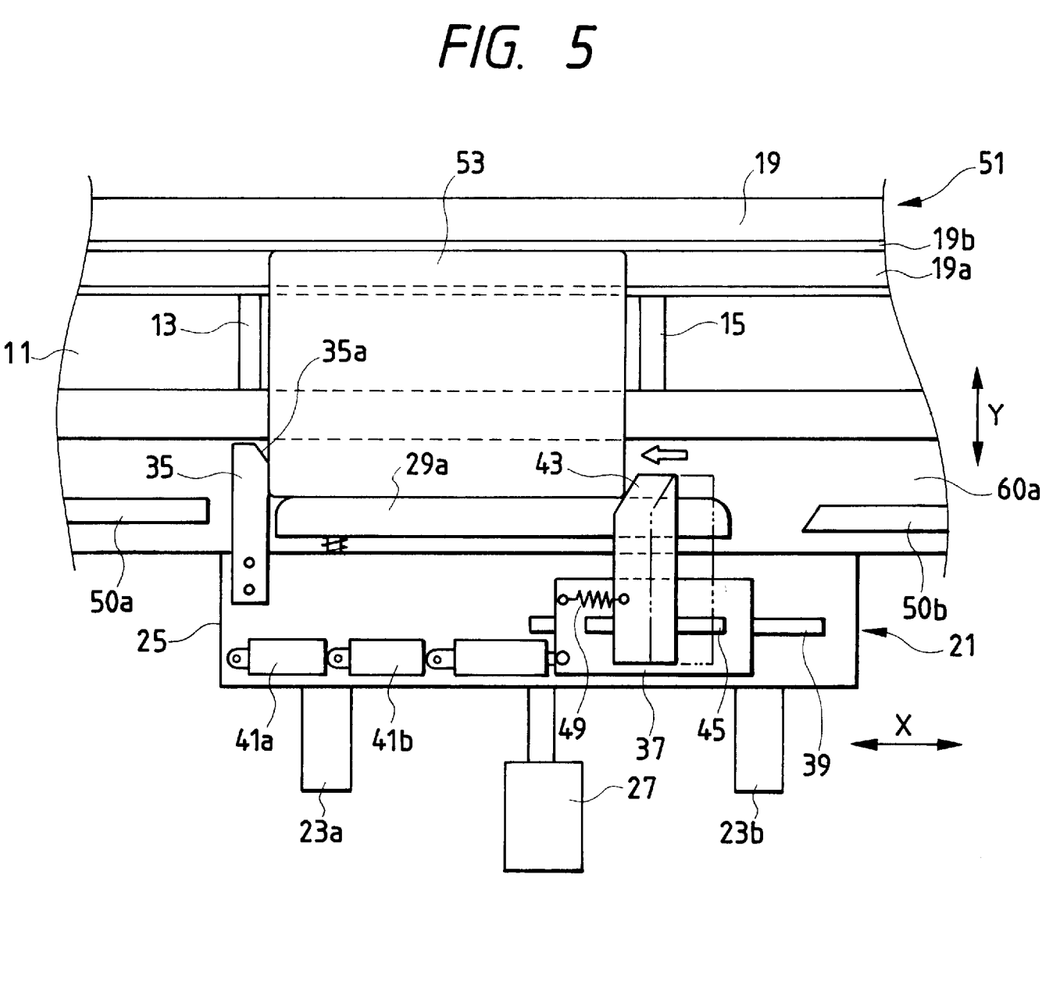
FIG. 5 is a plan view of the positioning apparatus of the invention at the time of positioning a small-sized workpiece.
Figure 6:
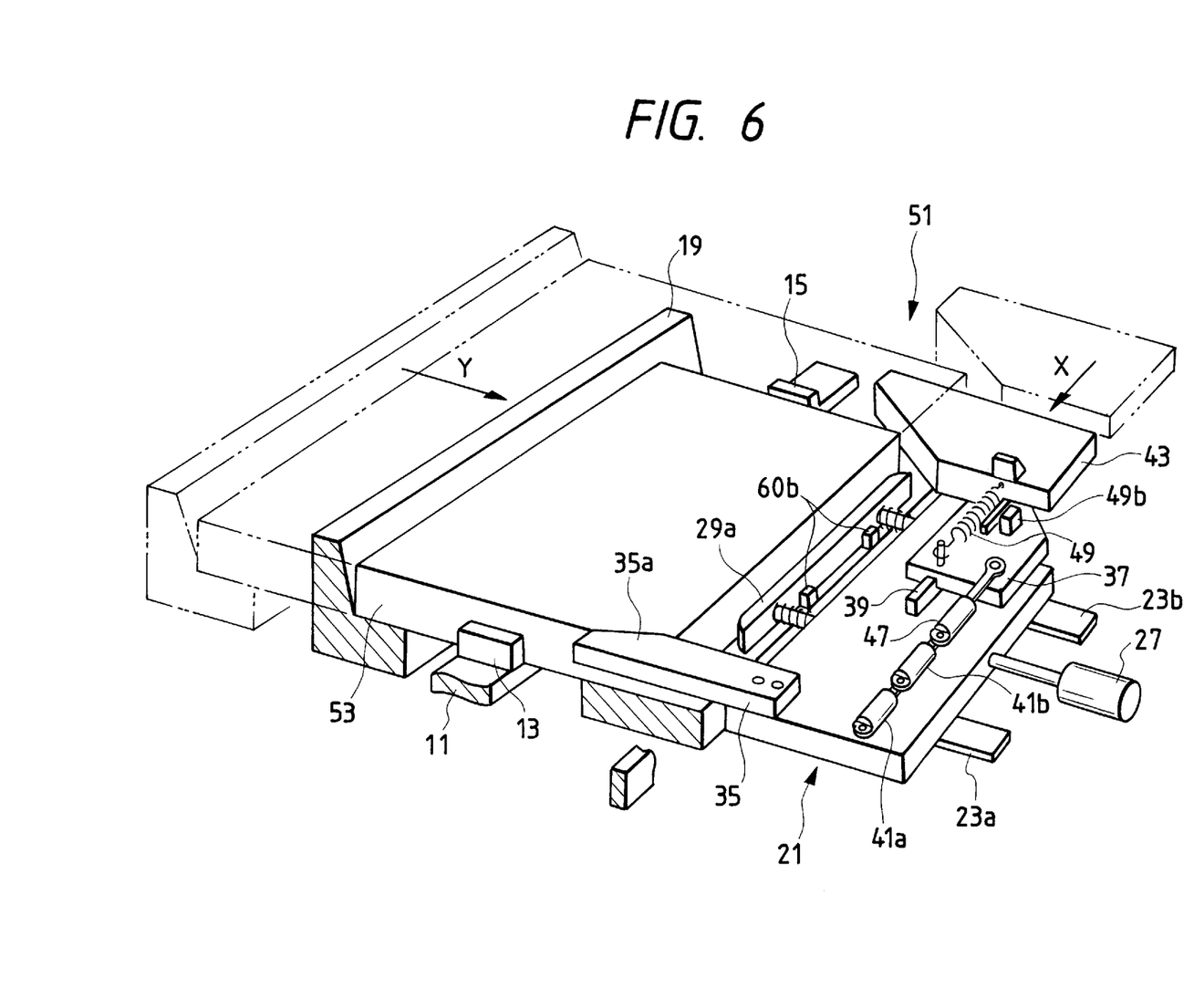
FIG. 6 is a perspective view of the positioning apparatus of the invention showing a condition at the time of moving a reference arm.
Figure 7:
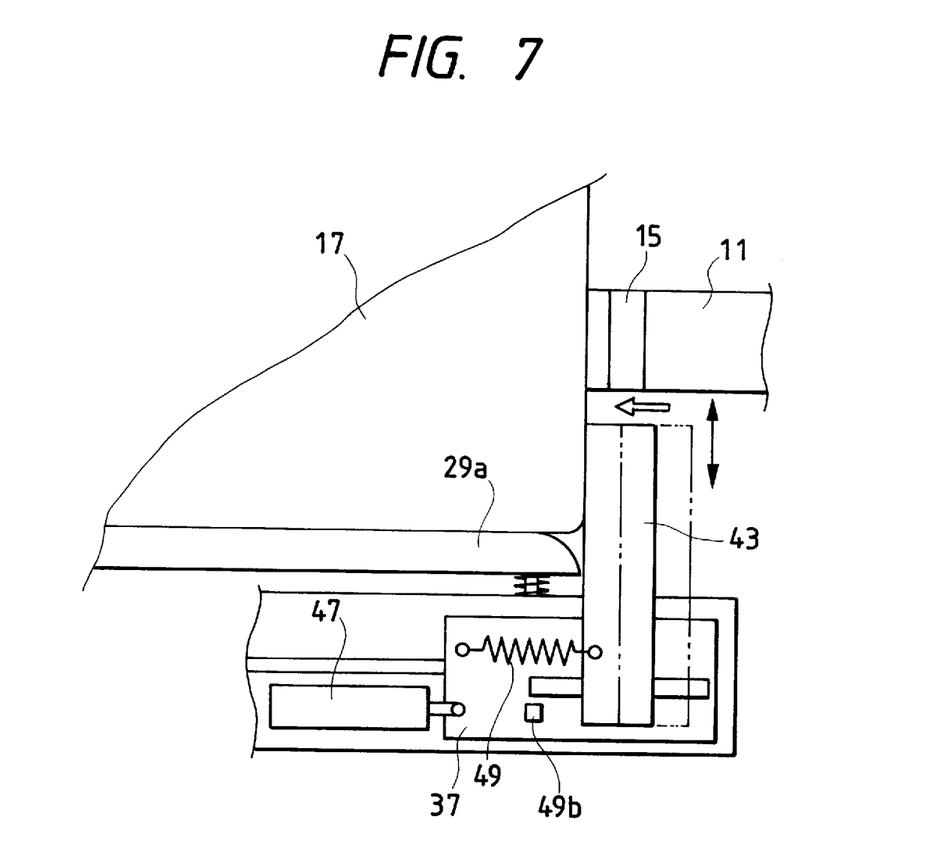
FIG. 7 is a plan view of a main portion showing another embodiment of the invention.

While the surface of the movable arm 43 abutting against the workpiece 17 is made to be inclined in FIGS. 1, 4, 5, and 6, the movable arm 43 may have such a rectangular shape with no inclined surface as shown in FIG. 7 as long as such movable arm 43 is positioned outside the outline of the workpiece.

Figure 4:
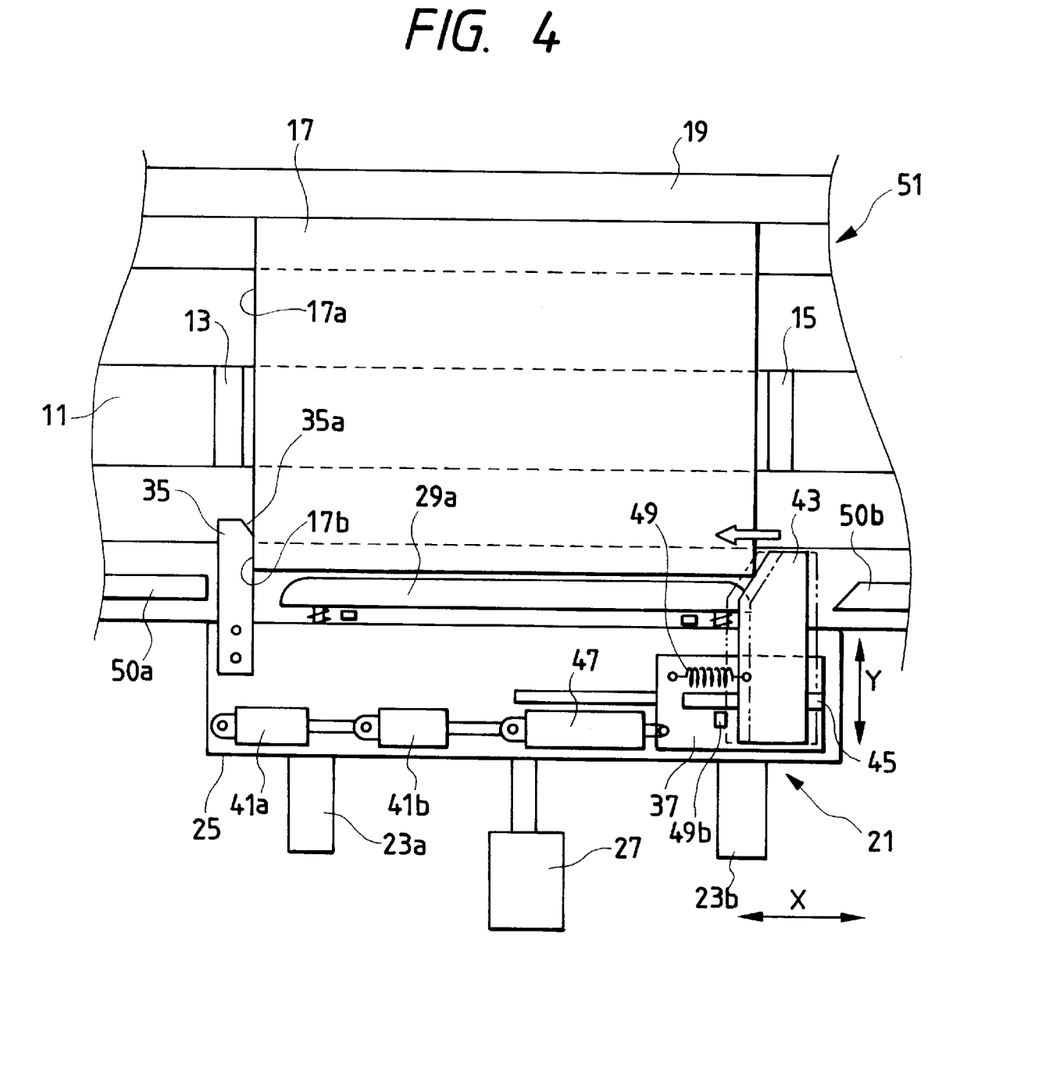
FIG. 4 is a plan view of the positioning apparatus of the invention at the time of positioning a large-sized workpiece.

An operation of the thus constructed workpiece positioning apparatus 51 will be described with reference to FIGS. 4 to 6. FIG. 4 is a plan view of the positioning apparatus of the invention at the time of positioning a large-sized workpiece; FIG. 5 is a plan view of the positioning apparatus of the invention at the time of positioning a small-sized workpiece; and FIG. 6 is a perspective view of the positioning apparatus of the invention showing a condition at the time of moving the reference arm.

The rear end 17a of the workpiece 17 is pressed by the forwarding claws 13, 15 of the belt conveyor 11 and the bottom surface of the workpiece 17 slides on the abutment surfaces 19a and 60a. Thus, the workpiece 17 is forwarded to a set position and stops at such set position by the forwarding claws 13, 15 of the belt conveyor 11. The workpiece 17 in stopped position is movable between the forwarding claws 13, 15, and has a clearance with respect to the reference guide 19 (see the condition shown in FIGS. 1 and 3A).

Then, the positioning unit 21 is moved closer to the workpiece 17 by the air cylinder 27 as a whole. First, the inclined surface 35a formed on the front end of the reference arm 35 is brought into contact with the corner 17b of the workpiece 17, so that the workpiece 17 is caused to move away from the forwarding claw 13.

Then, the workpiece press 29a is caused to abut against the workpiece 17 and the workpiece 17 is pressed onto the abutment surface 19a of the reference guide 19, so that the movement of the workpiece 17 is regulated in the directions orthogonal to the forwarding direction (the Y directions).

Then, the drive shaft of the positioning air cylinder 47 is contracted, so that the movable arm 43 is moved closer to the workpiece 17 along with the movable plate 37 by the positioning spring 49. As a result, the movement of the workpiece 17 is regulated in the forwarding directions (the X directions) by the reference arm 35 and the movable arm 43 in addition to the contracted force of the positioning spring 49.

Therefore, the workpiece 17 is regulated by the reference arm 35 and the movable arm 43 in the forwarding directions and by the reference guide 19 and the workpiece press 29a in the directions orthogonal to the forwarding directions, and is therefore positioned without coming in contact with the forwarding claws 13, 15. It may be noted that this construction allows the workpiece 17 to be positioned so as to move toward the reference arm 35 while leaving the workpiece 17 pressed by the workpiece press 29a by making the pressure of the workpiece press 29a smaller than the pressure of the positioning spring 49.

Then, a switching operation at the time the size of a workpiece is changed will be described with reference to FIGS. 5 and 6.

A small-sized workpiece 53 is positioned after the positions of the reference guide 19 and the movable arm 43 have been changed in advance. As shown in FIG. 6, the reference guide 19 is fixed after moving a difference in size between workpieces in the directions orthogonal to the forwarding directions (the Y directions) manually or by the air cylinder, the ball-bearing leadscrew, or the like. It may be noted that the operation of positioning the positioning unit 21 in the directions orthogonal to the forwarding directions is performed in a positional relationship similar to that of a large-sized workpiece 17 even if the size of a workpiece is changed.

The movable arm 43 moves the movable plate 37 by contracting the drive shafts of any two air cylinders out of the air cylinders 41a, 41b, and 47 by selecting a small size by a select switch (not shown) or the like, and the evacuated position of the movable arm 43 is set to a position corresponding to the small-sized workpiece 53.

The positioning operation in the forwarding directions is similarly performed in which when the workpiece 53 has reached, the movable plate 37 is moved by contracting the drive shaft of either one of the positioning air cylinders 41a, 41b, 47 and the movable arm 43 is drawn closer to the workpiece 53 by the positioning spring 49, so that the movement of the workpiece 53 in the forwarding directions is regulated by the reference arm 35 and the movable arm 43.

Further, a medium-sized workpiece whose size is between the large- and small-sized workpieces is positioned by moving the movable plate 37 while expanding one air cylinder whose drive shaft is contracted from the small-sized workpiece position and thereafter similarly causes the movable arm 43 to be moved by either one of the positioning air cylinders 41a, 41b, 47 and the positioning spring 49.

As a result of the aforementioned operation, the workpiece positioning apparatus 51 according to the embodiment of the invention can position workpieces of any size with high accuracy independently of the belt conveyor 11 stopping accuracy and without using any positioning tools and holding members as long as the workpiece is moved within the movable arm 43 moving range in the workpiece forwarding directions as well as within the positioning unit 21 and reference guide 19 moving ranges in the directions orthogonal to the forwarding directions.

It may be noted that a workpiece of any size can be positioned without difficulty at a position when the operation of one positioning air cylinder is delivered to the operation of another by setting at least one of the strokes of the positioning air cylinders 41a, 41b, 47 to a value larger than the values to which the strokes of other positioning air cylinders are set.

Further, while the example in which it is the reference guide 19 that is moved in the directions orthogonal to the forwarding directions has been described in the aforementioned embodiment, the workpiece positioning apparatus of the invention may be such that workpieces of various sizes are positioned only by moving the positioning unit 21 with the reference guide 19 fixed.

Still further, the movable plate 37 is moved by the air cylinders 41a, 41b, 47 in order to move the movable arm 43 to the evacuated position for accommodating workpieces of various sizes. However, at least one of the air cylinders 41a, 41b, 47 may be omitted for a relatively narrow size range. On the other hand, for a wide size range, the number of air cylinders may be increased to four or more.

As described in detail in the foregoing, the invention is characterized in that a reference guide is arranged on one of the sides of a forwarding surface interposing a forwarding device therebetween; a workpiece press for pressing the workpiece onto the reference guide are arranged so as to be evacuated from the forwarding surface while facing the reference guide; a reference arm abutting against one end of the workpiece in forwarding directions is arranged so as to be evacuated from the forwarding surface; and a movable arm for pressing the workpiece onto the reference arm while abutting against the other end of the workpiece in the forwarding directions is arranged so as to be evacuated from the forwarding surface.

Therefore, the workpiece positioning apparatus of the invention is designed to provide the reference arm and the reference guide in the forwarding directions and in the directions orthogonal to the forwarding directions, respectively, and pressing the workpiece onto the reference arm and the reference guide with the movable arm and the workpiece press so that the workpiece can be positioned in two directions orthogonal to each other. Therefore, workpieces of various types with different shapes can be positioned inexpensively as well as with high accuracy without using positioning tools and holding members within the movable arm moving range in the workpiece forwarding directions and without the workpiece press moving range in the directions orthogonal to the forwarding directions independently of the forwarding device stopping accuracy. As a result, the cumbersome tool changing operation or tool management can be eliminated, which in turn contributes to improving productivity in the automatic assembly line significantly.

What is claimed is:

1. A workpiece positioning apparatus for positioning a workpiece having first and second opposed sides and first and second opposed ends, comprising:
   a forwarding device for forwarding a workpiece in a forwarding direction wherein the forwarding device includes a forwarding claw for forwarding the workpiece;

a reference guide having a forwarding surface for contacting the first side of the workpiece with respect to the forwarding device;

a workpiece press pressing the workpiece against the reference guide on the second side of the workpiece opposed to the reference guide and being movable in a direction away from the workpiece;

a reference arm abutting against the first end of the workpiece with respect to the forwarding direction and being movable in a direction away from the workpiece wherein the reference arm includes an inclined surface formed on an end, the inclined surface moving the first end of the workpiece away from the forwarding claw by abutting against the first end of the workpiece when the reference arm is moved for positioning the workpiece; and a movable device abutting against the second end of the workpiece opposed to the first end in the forwarding direction for pressing the workpiece against the reference arm, and being movable in directions away from the workpiece.

2. A workpiece positioning apparatus for positioning a workpiece having first and second opposed sides and first and second opposed ends, comprising:

a forwarding device for forwarding a workpiece in a forwarding direction;

a reference guide having a forwarding surface for contacting the first side of the workpiece with respect to the forwarding device;

a workpiece press pressing the workpiece against the reference guide on the second side of the workpiece opposed to the reference guide and being movable in a direction away from the workpiece;

a reference arm abutting against the first end of the workpiece with respect to the forwarding direction and being movable in a direction away from the workpiece; and a movable device abutting against the second end of the workpiece opposed to the first end in the forwarding direction for pressing the workpiece against the reference arm, and being movable in directions away from the workpiece, wherein the movable device comprises a movable plate slideable toward and away from the reference arm, and a movable arm slideably mounted on the movable plate for contacting with the second end wherein the movable plate positions the movable arm at a position in relation to the reference arm which is changeable in accordance with a size of the workpiece.

3. The workpiece positioning apparatus of claim 1 wherein the reference guide is movable in a direction orthogonal to the forwarding direction so that the reference guide can be positioned in a desired position parallel to the forwarding direction.

4. The workpiece positioning apparatus of claim 1 wherein the workpiece press further includes a base plate on which the workpiece press is mounted, and at least one rail on which the base plate is mounted, the rail being positioned orthogonal to the forwarding direction so that the workpiece press can be moved to a preselected position orthogonal to the forwarding direction.

5. The workpiece positioning apparatus of claim 4 wherein the base plate is mounted on a pair of rails that are orthogonal to the forwarding direction, and wherein the apparatus further includes an air cylinder connected to the base plate that can move the base plate along the base plate rails.

6. The workpiece positioning apparatus of claim 1 wherein the workpiece press includes at least one spring to bias it toward the reference guide.

7. The workpiece positioning apparatus of claim 2 further including a moveable plate and a slide rail positioned parallel to the forwarding direction, wherein the moveable plate is slideably mounted on the slide rail and the moveable arm is positioned on the moveable plate so that the moveable arm can be slideably moved to preselected positions parallel to the forwarding direction.

8. The workpiece positioning apparatus of claim 7 further including at least one fluid-actuated cylinder mounted so as to move the moveable plate to preselected positions parallel to the forwarding direction.

9. The workpiece positioning apparatus of claim 8 further including a plurality of fluid-actuated cylinders coupled linearly to one another and mounted so as to move the moveable plate to preselected positions parallel to the forwarding direction.

10. The workpiece positioning apparatus of claim 2 wherein the moveable arm includes an angled surface for contacting the workpiece.

11. The workpiece positioning apparatus of claim 7 further including a positioning spring that is fixed at its one end to the moveable arm and at its other end to the moveable plate to bias the moveable arm toward the reference arm.

12. The workpiece positioning apparatus of claim 11 wherein the moveable plate further includes at least one fluid-actuated cylinder mounted so as to move the moveable plate to preselected positions parallel to the forwarding direction whereby the workpiece can be positioned between the moveable arm against the bias of the positioning spring and the reference arm.

13. The workpiece positioning apparatus of claim 12 further including a plurality of fluid-actuated cylinders coupled linearly to one another and mounted so as to move the moveable plate to preselected positions parallel to the forwarding direction.

14. The workpiece positioning apparatus of claim 13 wherein each of the linearly-coupled, fluid-actuated cylinders is capable of being actuated to move the moveable plate a different distance parallel to and along the forwarding direction.

15. The workpiece positioning apparatus of claim 2 wherein the reference guide is movable in a direction orthogonal to the forwarding direction so that the reference guide can be positioned in a desired position parallel to the forwarding direction.

16. The workpiece positioning apparatus of claim 2 wherein the workpiece press further includes a base plate on which the workpiece press is mounted, and at least one rail on which the base plate is mounted, the rail being positioned orthogonal to the forwarding direction so that the workpiece press can be moved to a preselected position orthogonal to the forwarding direction.

17. The workpiece positioning apparatus of claim 16 wherein the base plate is mounted on a pair of rails that are orthogonal to the forwarding direction, and wherein the apparatus further includes an air cylinder connected to the base plate that can move the base plate along the base plate rails.

18. The workpiece positioning apparatus of claim 2 wherein the workpiece press includes at least one spring to bias it toward the reference guide.

* * * * *